United States Patent [19]
Ohtsuka

[11] Patent Number: 5,272,576
[45] Date of Patent: Dec. 21, 1993

[54] MAGNETIC RECORDING AND REPRODUCING APPARATUS WITH RECORDING INHIBITION OPERATION

[75] Inventor: Susumu Ohtsuka, Ibaraki, Japan

[73] Assignee: Hitachi, Ltd., Tokyo, Japan

[21] Appl. No.: 618,384

[22] Filed: Nov. 27, 1990

[30] Foreign Application Priority Data

Nov. 28, 1989 [JP] Japan ................... 1-306591

[51] Int. Cl.$^5$ ................... G11B 15/04; H04N 5/78
[52] U.S. Cl. ................... 360/60; 360/37.1
[58] Field of Search ........... 360/60, 15, 27, 33.1, 360/37.1, 69; 358/319, 335; 369/47, 84

[56] References Cited

U.S. PATENT DOCUMENTS 4,631,603 12/1986 Ryan ................... 360/60
4,979,210 12/1990 Nagata et al. ................... 360/60

Primary Examiner—Donald Hajec
Assistant Examiner—Won Tue C. Kim
Attorney, Agent, or Firm—Antonelli, Terry, Stout & Kraus

[57] ABSTRACT

A recording or reproducing of an input video signal is prohibited in a recording mode operation when a recording inhibition signal is attached thereto and, when a mode other than the recording mode is set, the video signal of optimum level can be supplied to a television receiver even if the recording inhibition signal is attached to the video signal so that a sufficient monitoring becomes possible.

2 Claims, 1 Drawing Sheet

MAGNETIC RECORDING AND REPRODUCING APPARATUS WITH RECORDING INHIBITION OPERATION

BACKGROUND OF THE INVENTION

The present invention relates to a magnetic recording and reproducing apparatus for a video signal and, particularly, to a recording inhibition function to be performed thereby in response to a recording inhibition signal attached to an input video signal.

In order to protect information recorded on a commercially available magnetic tape such as soft tape, it is necessary to make an unauthorized dubbing of it onto another magnetic tape impossible. An example of a device for making such protection possible is disclosed in Japanese Kokai (P) No. 61-288582.

In the disclosed device, a recording inhibition signal called a "copy guard" signal is attached to a video signal recorded on a soft tape during a vertical blanking period thereof. When the video signal is reproduced and supplied to another magnetic recording and reproducing apparatus, an automatic gain control circuit provided in a recording processing system of the magnetic recording and reproducing apparatus for optimizing a level of the video signal for recording may malfunction due to the recording inhibition signal make the level of the video signal to very low so that it can not be recorded.

The recording inhibition signal comprises a plurality of paired pseudo synchronizing signals and positive pulses and is added between adjacent equalizing pulses in a vertical retrace period or between horizontal synchronizing signals. The pseudo synchronizing signal is in phase with the synchronizing signal and the positive pulse is out of phase with the synchronizing signal and has a level not lower than white level. The automatic gain control circuit provided in the recording processing system of the magnetic recording and reproducing apparatus usually detects the synchronizing signal of the video signal, detects the back porch level using the detected synchronizing signal as a timing reference and, in response to the detected back porch level, controls gain to make the level of the video signal optimum for recordation.

When the video signal to which the recording inhibition signal is attached is supplied to the automatic gain control circuit, the pseudo synchronizing signal is detected thereby in a similar manner to the synchronizing signal and a level of the subsequent positive pulse is detected using the pseudo synchronizing signal as a timing reference. Since, however, the level of the positive pulse is white level or higher which is very high compared with the back porch level, the gain of the automatic gain control circuit becomes very low, so that the video signal becomes too low to be recorded. Thus, the video signal can not be recorded or reproduced satisfactorily.

In general, in one operation mode of a magnetic recording and reproducing apparatus, there is a case where an external video signal supplied to the magnetic recording and reproducing apparatus is not recorded thereby but supplied thereby to a television receiver for monitoring thereon. Since, in such case, the video signal supplied to the television receiver is outputted from the automatic gain control circuit of the magnetic recording and reproducing apparatus, a level of the signal is also optimized.

In such mode of operation, if the external video signal is provided with such recording inhibition signal, the gain of the automatic gain control circuit may be set to a very low value, causing the video signal level to be very low and thus monitoring to be impossible.

SUMMARY OF THE INVENTION

An object of the present invention is to provide a magnetic recording and reproducing apparatus capable of operating, in a recording mode, to perform a recording inhibition function based on a recording inhibition signal and, in other modes than recording mode, excluding the recording inhibtion function.

The above object can be achieved according to the present invention by a provision of a recording inhibition means which is responsive to a recording inhibition signal for reducing gain of an automatic gain control circuit and is operable only when a recording mode is set.

When a recording mode of operation is set and an input video signal is provided with a recording inhibition signal, the recording inhibition means detects the inhibition signal to lower the gain of the automatic gain control circuit so that the level of the input video signal is lowered to a value insufficient for recording.

When any operation mode than recording mode, including temporal recording stop mode, other is set while the recording inhibition signal is attached to the input video signal, the gain setting of the automatic gain control circuit by the recording inhibition means is prohibited to allow the optimum level setting of video signal to be performed by the automatic gain control circuit.

BRIEF DESCRIPTION OF THE DRAWING

The present invention will be fully understood by those skilled in the art when reading the following description of an embodiment of the present invention with reference to the accompanying drawing in which.

DETAILED DESCRIPTION OF THE PREFERRED EMBODIMENT

Figure 1:
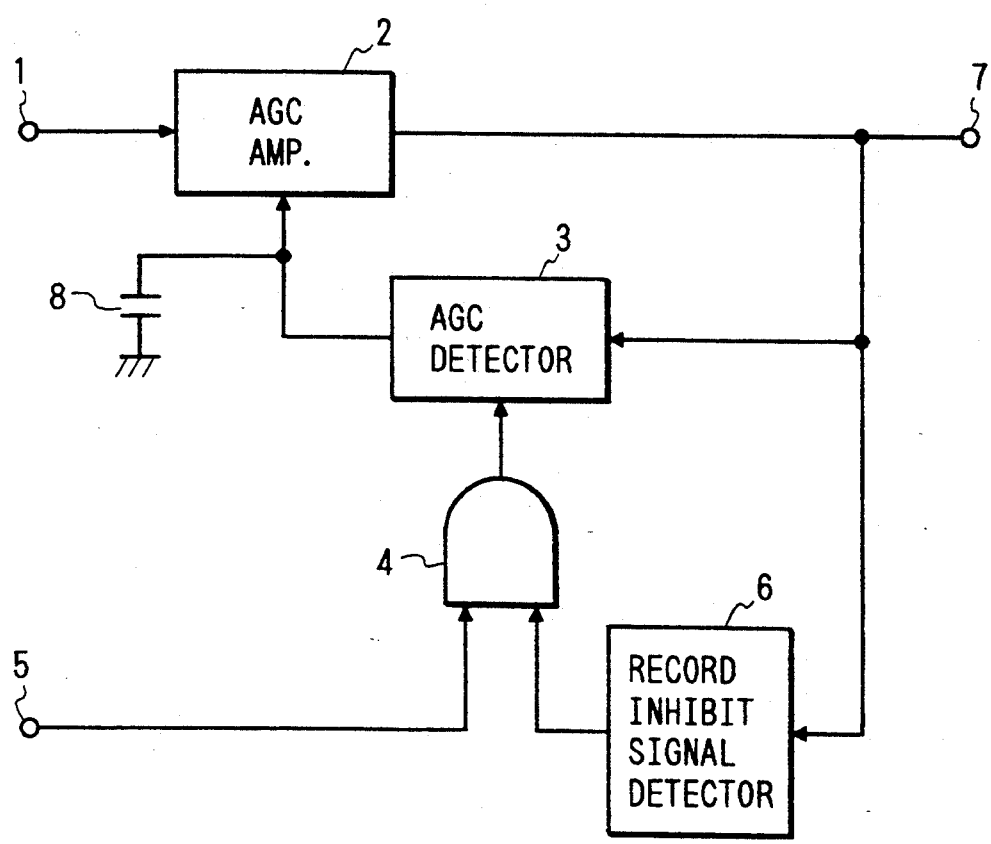
FIG. 1 is a schematic block circuit diagram of an embodiment of a magnetic recording and reproducing apparatus according to the present invention.

In the single figure, the magnetic recording and reproducing apparatus includes an automatic gain control (AGC) amplifier 2 having an input connected to an input terminal 1 and an output connected to an output terminal 7. Another input of the AGC amplifier 2 is connected to an output of an AGC detection circuit 3 having an input connected to the output terminal 7 and another input connected to an output of an AND gate 4. The output of the AGC detector 3 is grounded through a capacitor 8.

One input of the AND gate 4 is connected to another input terminal 5 and the other input thereof is connected to an output of a recording inhibition signal detector 6 having an input connected to the output terminal 7.

A color video signal is supplied to the input terminal 1 and its luminance signal is derived by the AGC amplifier 2 and provided at the output terminal 7 for supply to a subsequent processing circuit (not shown) for recording and/or monitoring. The luminance signal at the output of the AGC amplifuer 2 is also supplied to the AGC detector 3. The AGC detector 3 constitutes, together with the AGC amplifier 2 and the capacitor 8, a keyed AGC circuit which usually operates to add a synchronizing signal of the supplied luminance signal to the luminance signal as a key pulse to detect a level of a back porch and supplies it to the capacitor 8 as a detection output. The keyed AGC circuit does not detect the back porch level during a vertical retrace period. Therefore, if the video signal includes a recording inhibition signal, the AGC detector 3 does not detect the level of the recording inhibition signal.

The output level of the AGC detector 3 is held in the capacitor 8 to produce a gain control signal according to the detection outpt level. The gain of the AGC amplifier 2 is controlled by the gain control signal. When the detection output level of the AGC detector 3 is high, the gain of the AGC amplifier 2 is small. On the other hand, when the detection output level is low the gain of the AGC amplifier 2 is large.

In order to prevent the AGC dectector 3 from detecting the level of the recording inhibition signal attached during the vertical retrace period of the luminance signal, the vertical synchronizing signal of the luminance signal is separated and a gate signal having a duration including at least the recording inhibition signal is formed using the separated vertical synchronizing signal as a timing reference. The luminance signal supplied is cut away by this gate signal.

Only when a recording mode is set according to a mode setting signal from the input terminal 5, the mode signal can take a high "H" level. The recording inhibition signal detector 6 provides a detection signal which is high "H" when a recording inhibition signal is attached to the output signal of the AGC amplifier 2. When any recording inhibition signal is not detected by the detector 6, the latter provides a low "L" signal. The mode signal from the input terminal 5 and the output of the recording inhibition signal detector 6 are supplied to the inputs of the AND gate 4 and the AGC detector 3 is controlled by the output of he AND gate 4.

When the recording mode is set by a "H" level of the mode setting signal supplied to the input terminal 5 and a color video signal supplied to the input terminal 1 has a recording inhibition signal, which is detected by the "H" output of the recording inhibition signal detector 6, an output of the AND gate 4 becomes "H" upon which the output level of the AGC detector 3 is forcibly set to a very high level. Consequently, the gain of the AGC amplifier 2 becomes very small, so that the luminance signal level at the output terminal 7 becomes very low, causing a recording and/or reproducing thereof to be impossible.

When there is no recording inhibition signal attached to the color video signal supplied to the input terminal 1, the detection signal level of the recording inhibition signal detector 6 becomes "L" even if the recording mode is set. Therefore, the output of the AND gate 4 is "L" and thus the AGC detector 3 can operate normally to optimize the luminance signal level at the output terminal 7 for recordation.

In a case of an operation other than the recording mode, such as "temporal recording stop" mode, "stop" mode, etc., the mode setting signal supplied to the input terminal 5 is "L" and the output of the AND gate 4 is "L" even if the recording inhibition signal is attached to the color video signl supplied to the input terminal 1.

Therefore, the AGC detector 3 operates normally to optimize the luminance signal at the output terminal 7 for monitoring purpose.

As described, according to the present invention, the recording or reproducing of an input video signal is prohibited in a recording mode when a recording inhibition signal is attached thereto and, when a mode than the recording mode other is set, the video signal of optimum level can be supplied to a television receiver even if the recording inhibition signal is attached to the video signal, so that a sufficient monitoring becomes possible.

In the described embodiment, the AGC detector 3 blocks the luminance signal in a period between vertical blanking periods and including the recording inhibition signal and the output level at the output terminal 7 is forced to a very high level when the output of the AND gate 4 is "H". When the conventional copy guard signal is used as the recording inhibition signal, it is possible to terminate the blocking in the AGC detector 3 of the luminance signal during the vertical blanking period when the output of the AND gate 4 is "H" so that the level of the positive pulse during the recording inhibition signal is detected and held in the capacitor 8. In such case, the level of the luminance signal at the output terminal 7 becomes too low to use for recordation and or reproduction.

As described in detail, according to the present invention, a level of an input video signal is made very low in a recording mode when a recording inhibition signal is attached to the video signal, so that a recordation thereof becomes impossible. If the operation mode is not the recording mode, the video signal can be supplied to a monitor device with optimum signal level even if such recording inhibition signal is attached to the video signal.

What is claimed is:

1. In a magnetic recording and reproducing apparatus having a recording mode setting means and a recording inhibition signal producing means, a circuit arrangement comprising;
    an automatic gain control circuit for setting an input video signal at an optimum level for recordation;
    recording inhibition means responsive to a recording inhibition signal attached to the input video signal for controlling said automatic gain control circuit to lower the level of the input video signal to thereby prevent a recordation of the input video signal; and
    means for making said recording inhibition means responsive to said recording inhibition signal only when a recording mode of operation is set.

2. A circuit arrangement according to claim 1, wherein said means for making said recording inhibition means responsive to said recording inhibition signal only when a recording mode of operation is set comprises a recording inhibition signal detecting means and an AND gate having an operation mode setting input for receiving an operation mode setting signal and an input connected to an output of said recording inhibition signal detecting means and providing an output signal for making said recording inhibition signal effective when the operation mode setting signal sets the recording mode.

* * * * *